United States Patent [19]

Matsumura et al.

[11] 4,338,012
[45] Jul. 6, 1982

[54] FOCUSING SCREEN

[75] Inventors: Susumu Matsumura, Kawasaki; Takashi Suzuki, Yokohama; Kazuya Matsumoto, Yokohama; Kikuo Momiyama, Yokohama, all of Japan

[73] Assignee: Canon Kabushiki Kaisha, Tokyo, Japan

[21] Appl. No.: 204,009

[22] Filed: Oct. 31, 1980

[51] Int. Cl.³ ........................ G02B 5/04; G03B 13/28
[52] U.S. Cl. ..................................... 354/200; 350/286
[58] Field of Search ................. 354/199, 200; 350/286

[56] References Cited

U.S. PATENT DOCUMENTS 2,881,686  4/1959  Rühle ........................... 354/200 UX
4,003,637  1/1977  Masuoka ............................ 350/286

FOREIGN PATENT DOCUMENTS 1157316  12/1957  France ................................. 354/200
52-27634  3/1977  Japan .................................. 354/200
961033   6/1964  United Kingdom ................ 354/200

*Primary Examiner*—Donald A. Griffin
*Attorney, Agent, or Firm*—Fitzpatrick, Cella, Harper & Scinto

[57] ABSTRACT

This specification discloses a focusing screen adapted for use with the range finder of a camera, particularly a split image type focusing screen. This screen comprises a pair of portions desposed in the center of the real image plane of the camera, and each portion has a refracting means and a diffracting means. Thereby, in a defocused condition, the images viewed through the portions are split each other and blurred. Further, this screen can be used wth an objective lens having a small aperture ratio.

19 Claims, 49 Drawing Figures

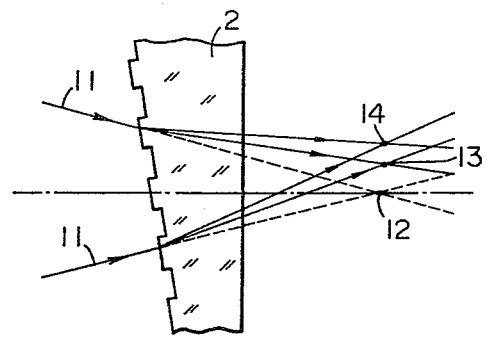
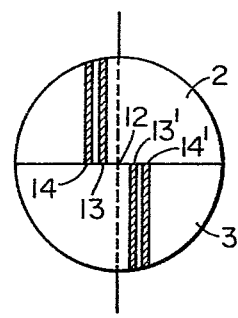
FIG. 5A  FIG. 5B
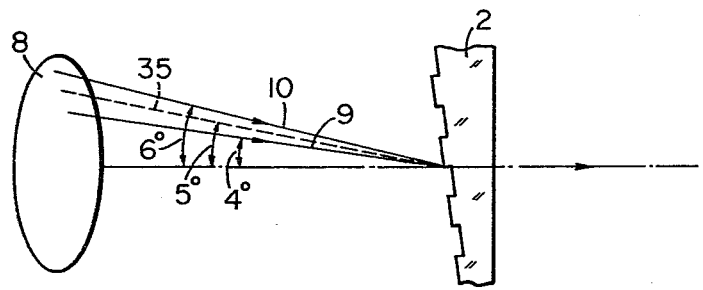
FIG. 6
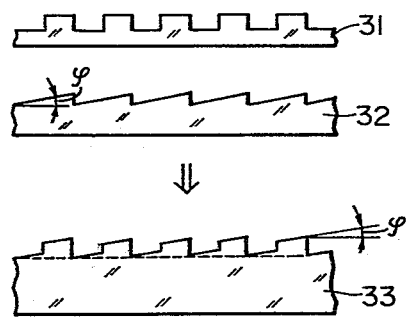
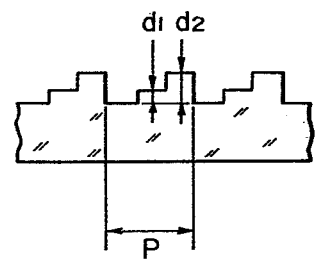
FIG. 7  FIG. 8

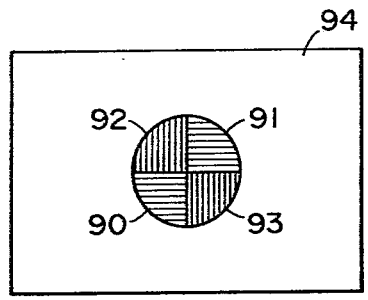
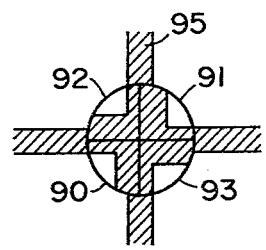
FIG. 36A  FIG. 36B
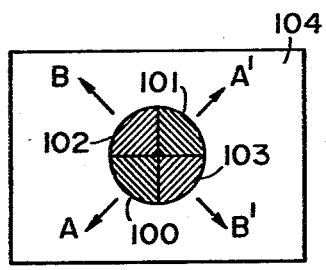
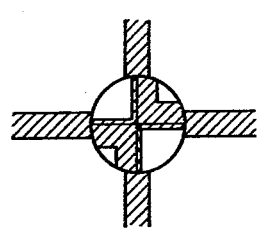
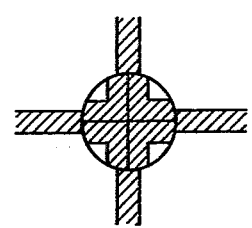
FIG. 37A  FIG. 37B  FIG. 37D
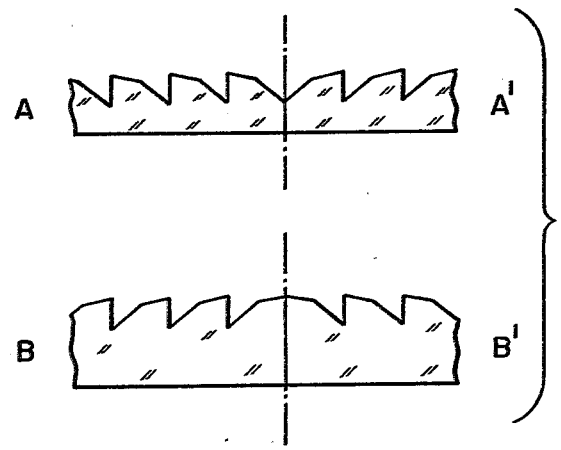
FIG. 37C

FOCUSING SCREEN

BACKGROUND OF THE INVENTION

1. Field of the Invention

This invention relates to a focusing screen adapted to be mounted in the optical viewing path of a camera.

2. Description of the Prior Art

Cameras of the single lens reflux type and also of the range finder type generally include a focus indicating system utilizing an image splitting bi-prism. This focus indicating system usually comprises a focusing screen having a focus indicating part disposed in the center of the real image plane of the range finder and comprising image splitting prisms.

The focus indicating system of such split-image type, as compared with other systems, has a good focusing accuracy, but suffers from a phenomenon that the focus indicating part dark-changes for an interchangeable lens having a large F-number, namely, one low in brightness.

As the aperture ratio of the lens is decreased, the image splitting bi-prism has a larger dark area. Accordingly, the focusing becomes more difficult with increasing F-number of the lens.

This focus indicating accuracy and the darkness of the focus indicating part have a relation contrary to each other (inversely proportional to each other) for the vertical angle of the image splitting prism. This contrary relation is attributable to the fact that, among the light beams from the exit pupil of the lens, only the light beam having a particular angle of incidence determined by the vertical angle of the image splitting prism passes through the range finder and reaches the eye of the observer and contributes to the focus indicating. That is, if the vertical angle of the splitting prism is increased, the light rays from the marginal portion of the exit pupil of the phototaking lens can be directed to the eye-piece of the view finder and thus, the focus indicating accuracy is enhanced. However, a splitting prism having a great vertical angle has its focus indicating part dark-changeable even for an interchangeable lens which is a little dark, namely, which has a large F-number, and thus, the focus indicating becomes impossible.

Conversely, if the vertical angle of the prism is made small, the focus indicating accuracy is reduced but the focus indicating is possible even for an interchangeable lens which has a large F-number, namely, which is considerably dark.

To overcome such phenomenon, the vertical angle of the image splitting prism usually is not rendered to so great a value but is minimized to an angle in the vicinity of 8° so that, even if the focus indicating accuracy is sacrificed to some extent, the focus indicating becomes possible even for a dark interchangeable lens having an F-number of the order of 5.6.

However, for interchangeable lenses of a smaller maximum aperture ratio, for example, f/8 and larger, the aforementioned problem of dark prism is again presented.

SUMMARY OF THE INVENTION

An object of the present invention is to provide a novel and improved focusing screen.

Another object of the present invention is to provide a focusing screen which enables a focus condition to be easily detected.

Still another object of the present invention is to provide a focusing screen which has a small degree of dark and can be used even if a dark or slow speed lens having a large F-number is used.

Yet another object of the present invention is to provide a focusing screen in which the relation between the aforementioned focus indicating accuracy and the darkening of the prism is alleviated and even if a dark interchangeable lens is used, the focus indicating is possible at high focusing accuracy.

The invention will become fully apparent from the following detailed description thereof taken in conjunction with the accompanying drawings.

BRIEF DESCRIPTION OF THE DRAWINGS

FIGS. 5A and 5B illustrate the action which is imparted to an image by the light deflecting portion.

FIG. 6 illustrates the manner in which the incident light beam from the exit pupil of a lens is deflected by the light deflecting portion.

FIG. 7 is a cross-sectional view of the light deflecting portion according to another embodiment.

FIG. 8 is a cross-sectional view of a three-step type diffraction lattice.

FIGS. 36A and 36B show the focusing screen in a first application.

FIGS. 37A, 37B, 37C and 37D show the focusing screen in a second application.

DESCRIPTION OF THE PREFERRED EMBODIMENTS

Figure 1:
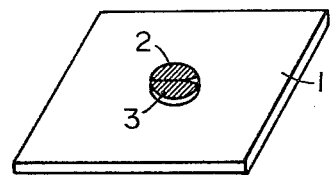
FIG. 1 is a perspective view of a focusing screen.
Figure 2:
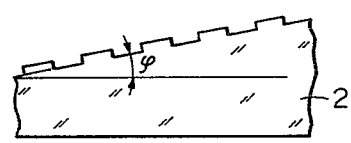
FIG. 2 is a cross-sectional view of the light deflecting portion 2 of the focusing screen.
Figure 3:
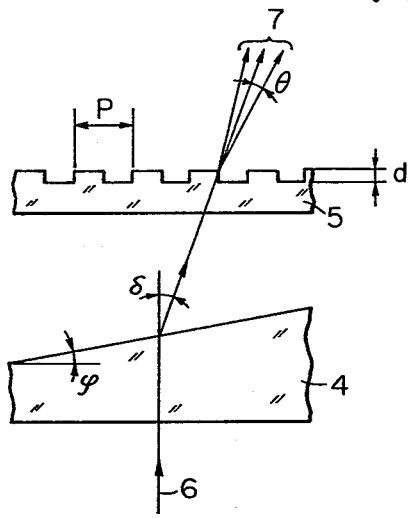
FIG. 3 shows the functional resolution of the light deflecting portion 2.

Referring to FIG. 1, it shows the whole of a focusing screen which is a first embodiment of the present invention. In FIG. 1, reference numeral 1 designates the focusing screen which is supported in the range finder of a single lens reflex camera coincidently with the image plane thereof. Designated by 2 and 3 are a pair of light deflecting portions for split image which together form a focus indicating part which is mounted in the center of the focusing screen. An enlarged cross-sectional view of the light deflecting portion 2 is shown in FIG. 2. The light deflecting portion 2 for split image shown in FIG. 2 comprises a prism 4 having a vertical angle $\phi$ as shown in FIG. 3 and a phase type rectangular diffraction lattice 5 having concavo-convexity of a width of $\frac{1}{2}$ of period P, said prism 4 and said diffraction lattice 5 being integrally overlapped with each other. That is, this light deflecting portion is of such a construction that a concavo-convex phase type rectangular diffraction grating is provided on a prism having a vertical angle $\phi$.

Accordingly, a light ray 6 which has entered the light deflecting portion 2 from an objective lens 8 is deflected by $\delta$ by the refracting action of the prism 4 as shown in the functional resolution diagram of FIG. 3, and is further diffracted by the phase diffraction to provide a collection 7 of multiple orders of diffracted lights.

On the other hand, the light deflecting portion 3, like the portion 2, comprises a prism and a diffraction lattice overlapped with each other, but since the prism and the diffraction lattice are oppositely oriented, a light ray entering the portion 3 is deflected by $-\delta$ and diffracted.

Figure 4:
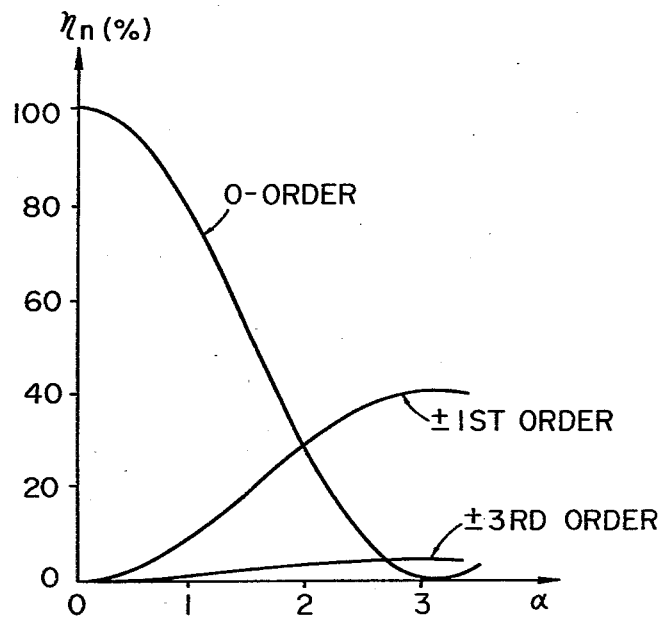
FIG. 4 shows the diffraction efficiency of the light deflecting portion.

As is well-known, where the refractive index of the lattice member is n and the amount of concavo-convexity is d, the n-order diffraction efficiency (=diffraction degree light intensity/incident light intensity $\eta$n of this concavo-convex phase diffraction lattice for a certain wavelength $\lambda$ of visible light is:

$$\eta n = \begin{cases} \cos^2\alpha & n = 0 \\ \sin^2\alpha / \left(\frac{m}{2}\pi\right)^2 & n \text{ odd number} \\ 0 & n \text{ even number} \end{cases}$$

where $\alpha = \pi(n-1)d/\lambda$. FIG. 4 shows the graph of $\eta n$ when $\alpha$ was varied by varying the amount of concavo-convexity d. Accordingly, in the case of the diffraction lattice of this type, there are chiefly produced 0-order and $\pm 1$st order diffracted light. Also, the angle $\theta$ between the 1st order diffracted light and the 0-order diffracted light is $$\theta = \sin^{-1}(\lambda/p).$$

Here, when the diffraction lattice conditions in the present embodiment are set so that n=1.5, $\lambda=0.5$ $\mu$m, d=2$\lambda$=1.0 $\mu$m, namely, $\alpha=\pi$, then $\eta_0=0$ and $\eta\pm 1=40\%$, as is apparent from FIG. 4, and substantially only $\pm 1$st order diffracted light is produced. Also, when the period p=28.6 $\mu$m, the angle between the $\pm 1$st order diffracted light and the 0-order diffracted light is $\theta=1°$ and accordingly, if the vertical angle $\phi$ (shown in FIG. 3) of the prism is secured so that $\delta=5°$, the light beam having entered from the plane side produces only $\pm 1$st order diffracted lights if high order diffracted lights are neglected, and they exit in the directions of 4° and 6°, respectively, with respect to the optical axis. By this action, the object image, when in its defocused condition, is laterally deviated and separated by the split image prism 4 shown in FIG. 3 and further, by the action of the diffraction lattice 5, each laterally deviated and separated image itself is separated into a double image and, when this double image separation is small, it is viewed as a blur of the image. This phenomenon will be fully described by reference to FIG. 5. The direction of incidence of light ray is reverse to that in FIG. 3, but the action of the light deflecting portion is the same as that in FIG. 3. The light deflecting portion 2 shown in FIG. 2 does not produce any diffracted wave when in its focus condition, and the image may be viewed without any inconvenience. However, when in its defocus (out of focus) condition, the light deflecting portion 2 produces diffracted waves as shown in FIG. 5A. That is, a light beam 11 entering the focus indicating part so as to be converged at a point 12 on the optical axis is refracted in the direction of an angle $\delta=5°$ by the prism action of the prism-like structure 2 and also is diffracted by the action of the diffraction lattice in the directions of $\pm 1°$ on the opposite sides thereof, and point images 13 and 14 are formed by the respective light rays. Accordingly, when this condition is viewed through a finder, as shown in FIG. 5B, the object image (shown as linear images in the Figure) whose upper and lower portions are laterally deviated from each other by the split image action of the light deflecting portions 2 and 3 will be observed and the object image will be observed as being separated into a double image. Designated by 13' and 14' are image points separated by the light deflecting portion 3. If the degree of separation of the image is made small by the diffraction lattice, the object image will be observed as being blurred rather than as a double image. Further, although slight, the marginal portion of the image is colored by dispersion of the diffraction lattice.

As regards the linear image in defocus condition thus observed on this focus indicating part, when the double image by the ±1st order diffracted light is indicated on the upper and lower light deflecting portions as shown in FIG. 5B and the focus condition has been brought about, that is, the object image has become accurately coincident with the focusing screen, the blur of the image (or double image) by the diffraction disappears and the upper and lower images separated with the boundary between the positions 2 and 3 as the border become coincident with each other. By this phenomenon, the focus condition can be easily detected.

Incidentally, as shown in FIG. 6, in the present embodiment, the light deflecting portion 2 having the aforementioned diffraction condition in the focus indicating part effectively directs chiefly to an eye-piece (not shown) the light rays 9 and 10 of the light beam from the exit pupil 8 of the phototaking lens which form angles of 4° and 6°, respectively, with respect to the optical axis. The other deflecting portion 3 directs to the eye-piece the light rays which enter from the opposite side to the light rays 9 and 10 with respect to the optical axis.

In this manner, each portion of the focus indicating part of the present invention utilizes for the focus indicating the two light rays 9 and 10 different in angle of incidence coming from the interchangeable lens and therefore, the range of F-number of the lens for which the focus indicating is possible becomes wider.

That is, in an ordinary prism type focus indicating system wherein the vertical angle of the prism is equal to that of the light deflecting portions 2, 3 of the present embodiment, a light ray 35 (FIG. 6) forming an angle of 5° with respect to the optical axis is directed chiefly to the eye-piece and utilized for the focus indicating and therefore, in a lens having a large F-number wherein the light ray 35 is eclipsed by the eye-piece after being deflected by the prism, the focus indicating is difficult, whereas in the focus indicating part of the present embodiment, the two light rays 9 and 10 different in angle of incidence coming from the lens exit pupil are utilized for the focus indicating and therefore, even in a case where the light ray 10 does not enter a dark or slow speed lens having a great F-number, the focus indicating is possible if the light ray 9 enters the lens. If the aforementioned numerical value is employed, the focus indicating part does not dark-change even for a lens having such a small exit pupil that there is only present the light ray 9 forming an angle of maximum 4° with respect to the optical axis, and thus the focus indicating is possible.

Thus, the focus indicating part of the present embodiment can accomplish the focus indicating of higher accuracy since both the light rays 9 and 10 are used for a high speed lens having a small F-number, and can accomplish the focus indicating by using the light ray 9, for a dark lens having a large F-number.

Further, by varying the pitch of the diffraction lattice and the vertical angle of the split prism, utilization of a light ray forming what degree of angle with respect to the optical axis for the purpose of focus indicating can be controlled in designing. Accordingly, an optimal focus indicating part can be designed in accordance with each camera system.

FIG. 7 shows a focusing screen in which image splitting prisms have been replaced with Fresnel prisms. In this focusing screen, a set of concavo-convex structures of a diffraction lattice 31 are mounted on each Fresnel band of a light deflecting portion 33. The vertical angle of each Fresnel band is equal to the vertical angle $\phi$ of the former prism.

In the foregoing description, the 0-order diffraction efficiency has been zero, whereas the focusing screen of the present invention is not restricted thereto. For example, if the lattice is designed such that the 0-order and the ±1st order diffraction efficiency are equal, a triple image instead of a double image will appear on each of the upper and lower portions in FIG. 5B, but this is not an obstruction in the present invention. Rather, each split image will look further blurred and in some cases, this will be effective.

When an ordinary rectangular diffraction lattice as indicated at 5 in FIG. 3 is used, the ±1st and the −1st order diffraction efficiency become equal to arbitrary $\alpha$, as shown in FIG. 4. This shows that when d is constant, $\eta_1(\lambda)+\eta_{-1}(\lambda)$ for an arbitrary wavelength $\lambda$. Accordingly, the color of the +1st order diffracted light beam is the same as the color of the −1st order diffracted light beam, and the images 13 and 14 in FIG. 5B looks substantially the same color and only in the marginal portion of the images, there is produced the coloring resulting from the dispersion of the diffraction lattice. As an embodiment for causing such coloring to be produced more apparently, description will now be made of a case where a special rectangular diffraction lattice as shown below is used.

As shown in the article "Color Separation Grating" appearing in *Applied Optics* 17(15), 2273, 1978, a rectangular diffraction lattice having a staircase-like structure as shown in FIG. 8 has a color filter-like action. In FIG. 8, the width of each step is ⅓ of the pitch P. As shown in said article, by the diffraction lattice conditions, the 1st order, the 0-order and the −1st order diffracted light beam can be colored to three primary colors, i.e., red, green and blue. Also, if a diffraction lattice configuration is designed by utilizing the equations 8 and 9 appearing in page 2274 of the same article, there may be obtained a diffraction lattice having a diffracting action which divides an incident white light into two light beams different in color. An example of this is shown in FIG. 9.

Figure 9:
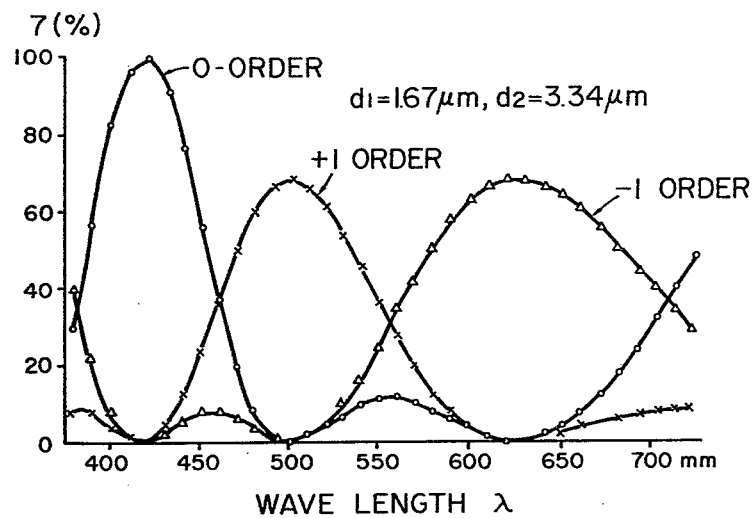
FIG. 9 illustrates the diffraction efficiency of the three-step type diffraction lattice.

FIG. 9 is a graph showing wavelength dependency of the diffraction efficiency when the refractive index of the diffraction lattice member is 1.5 and the step differences are $d_1=1.67$ μm and $d_2=3.34$ μm. As can be seen from this graph, the blue light of the white incident light is divided into the 1st order diffracted light beam, the red light of the white incident light is divided into the −1st order diffracted light beam and the 0-order diffracted light beam can be very much weakened in the visible range.

Figure 10A:
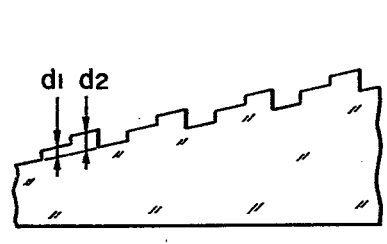
FIG. 10A is a cross-sectional view of a light deflecting portion in which the three-step type diffraction lattice is provided on a prism.
Figure 10B:
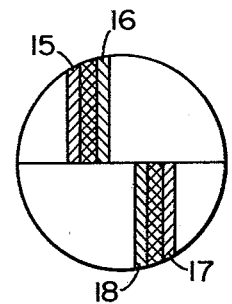
FIG. 10B shows a linear image viewed through a focus indicating part using the light deflecting portion of FIG. 10A.

Accordingly, in a focus indicating part in which a light deflecting portion as shown in FIG. 10A wherein such a diffraction lattice is provided on an image splitting prism is combined with an oppositely oriented portion, the defocused white linear image is such that a double image separated chiefly into red and blue as shown in FIG. 10B is separated into upper and lower portions and halves of the image have relative displacement.

In FIG. 10B, reference numerals 15 and 17 designate blue images formed by the 1st order diffracted light, and reference numerals 16 and 18 denote red images formed by the −1st order diffracted light. The 0-order diffracted light has been neglected because it is weak in intensity. At the area in which the images 15 and 16 overlap each other, there is seen a white image to which red and blue are added, and a blue and a red image are seen around said area, and further, these are laterally deviated in the upper and lower portions.

When the real image has become coincident with the proper plane of the light deflecting portion, the blue image 15 and the red image 16 overlap each other and likewise, the blue image 17 and the red image 18 overlap each other, whereby the coloring of red and blue disappears and the right color of the object can be observed. Any relative displacement of the two upper and lower halves of the image is not observed.

If $d_1$ and $d_2$ in FIG. 8 are replaced with each other, the +1st order and the −1st order diffracted light in FIG. 9 are replaced with each other. Accordingly, if, for example, the values of $d_1$ and $d_2$ are reversed in the upper semicircular light deflecting portion and the lower semicircular light deflecting portion of the focus indicating part, the coloring in the lower portion will be created in the direction opposite to the direction in which the coloring in the upper portion appears.

Figure 11:
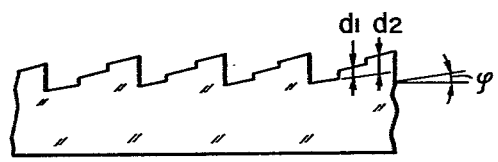
FIG. 11 shows a modification of the light deflecting portion of FIG. 10A.

The widths of the concave and convex portions need not always be equal to each other. An embodiment using a Fresnel-like prism as a prism on which the coloring type diffraction lattice shown in FIG. 10 is provided is shown in FIG. 11.

Figure 12:
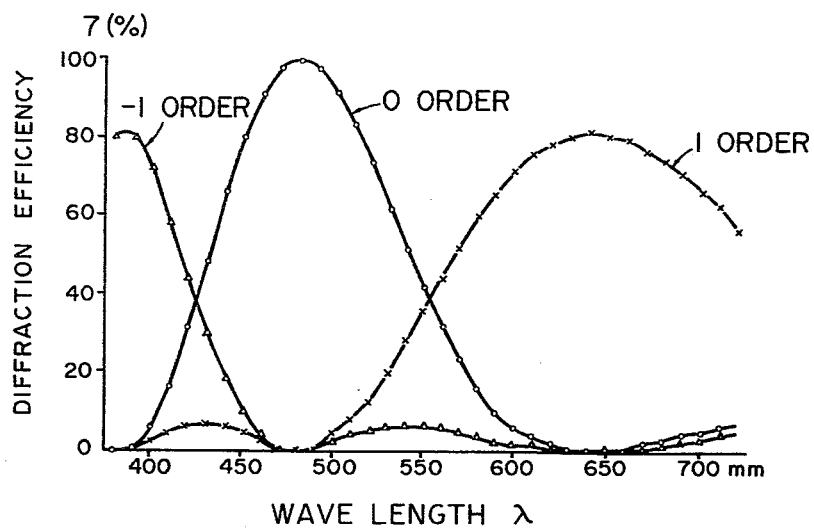
FIG. 12 illustrates the diffraction efficiency of a light deflecting portion in which a four-step type diffraction lattice is provided on a prism.

Further, FIG. 12 shows an example of the calculation of the diffraction efficiency in a light deflecting portion wherein a 4-step rectangular diffraction lattice having one more step added to the 3-step rectangular diffraction lattice shown in FIG. 8 is provided on a prism. The concave-convexity step differences $d_1$, $d_2$ and $d_3$ are 0.96 $\mu$m, 1.92 $\mu$m and 2.88 $\mu$m, respectively. In the focus indicating part of this embodiment, the 0-order light beam and the 1st order light beam are colored into blue and red, respectively. The −1st order diffracted light beam is very weak in the range of visible light. Also, in this case, unlike the case of FIG. 9, the image formed by the 1st order diffracted light is utilized and therefore, where the period of the diffraction lattice is the same as that of FIG. 9, there is produced a more proximate double image. Thus, it is generally possible to utilize an n-step rectangular diffraction lattice.

The foregoing description has been made with respect chiefly to the case where a rectangular step difference diffraction lattice is provided on a prism, whereas the diffraction structure provided on the prism is not restricted thereto. For example, utilization may be made of a diffraction lattice having a sinusoidal wave-like concave-convex structure, as well as a diffraction lattice having a relief structure of the saw-tooth wave type or the roof type. Also, a diffraction lattice comprising a minute prism-like structure as shown hereinafter may be utilized.

Figure 13:
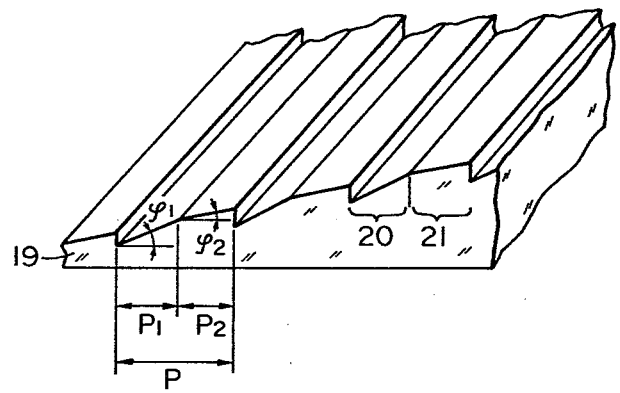
FIG. 13 is a schematic view of the light deflecting portion according to still another embodiment.
Figures 14, 15:
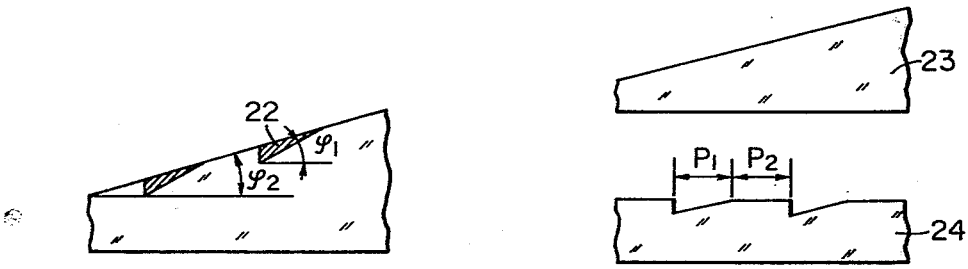
FIG. 14 is a cross-sectional view of the light deflecting portion of FIG. 13.
FIG. 15 shows the functional resolution of the light deflection portion of FIG. 14.

FIG. 13 is a perspective view of one of the light deflecting portions according to another embodiment of the present invention. FIG. 14, like FIG. 2, is an enlarged cross-sectional view of one of the light deflecting portions 19 in the split image type focus indicating part of the present embodiment. As shown in FIG. 14, this light deflecting portion is one in which, on a prism having a vertical angle $\phi_2$, cuts of a minute prism-like diffraction lattice are periodically provided and portions 22 indicated by hatching have been removed.

Accordingly, this light deflecting portion is functionally the same as a refraction lattice having fine cuts on a prism 23 as shown in FIG. 15, and has both functions.

As can be seen from the structure of FIG. 13, if viewed from another angle, this light deflecting portion comprises a periodical arrangement of minute prisms 20 having a vertical angle $\phi_1$ and minute prisms 21 having a vertical angle $\phi_2$. Due to such a construction, the angle at which a light ray having entered this focus indicating part is deflected in the portion of the minute prism 20 differs from the angle at which said light ray is deflected in the portion of the minute prism 21. Accordingly, as in FIG. 5, light rays different in angle coming from the entrance pupil are directed to the eye-piece. Therefore, the focus indicating performance of this focus indicating part is also similar to that of the focus indicating part having the construction as shown in FIG. 5.

Figure 16:
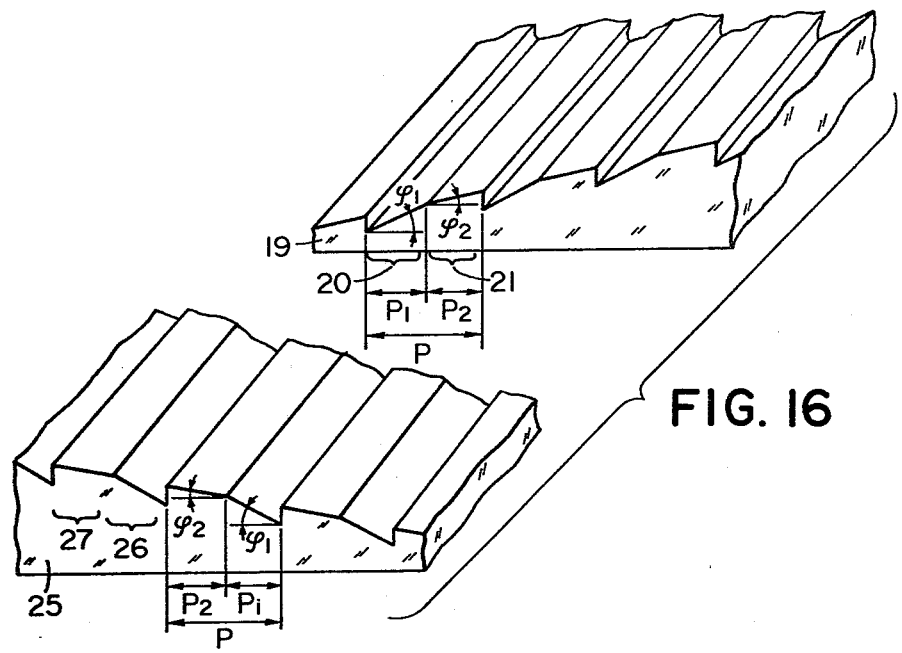
FIG. 16 is a schematic view of a focus indicating part comprising a combination of two light deflecting portions as shown in FIG. 13.

Accordingly, by combining the light deflecting portion of FIG. 13 with the light deflecting portion 25 of FIG. 16 which is similar in form thereto but oppositely oriented, there may be realized a split image type focus indicating part which will provide lateral deviation of the upper and lower images as well as blur (double image) or coloring of image.

Figure 17:
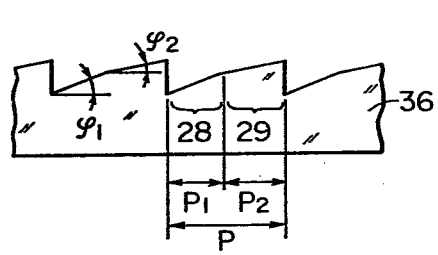
FIGS. 17 and 18 are cross-sectional views of the light deflecting portions according to different embodiments.
Figure 18:
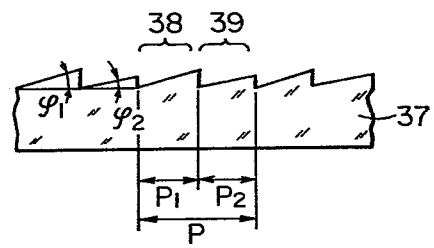

By replacing the image splitting basic prism with a Fresnel prism as previously described in each light deflecting portion 19, 25 shown in FIG. 16, it is possible to realize a light deflecting portion having the cross-section as shown in FIGS. 17 and 18. The light deflecting portion of such configuration has the same function as that of the light deflecting portion shown in FIG. 13. In FIGS. 17 and 18, the light deflecting portion 35 has a unit structure of diffraction lattice formed on one Fresnel band of the basic prism, said unit structure having the same pitch but being smaller than the width of the Fresnel band. That is, a set of minute prisms 28, 29 having vertical angles $\phi_1$ and $\phi_2$ correspond to one Fresnel band 30. In FIGS. 17 and 18, P designates the width of one Fresnel band, and $P_1$ or $P_2$ designates the width of the unit structure of the diffraction lattice.

On the other hand, if viewed from still another angle, the light deflecting portion shown in FIGS. 17 and 18 may be said to comprise a periodical arrangement of prism-like unit structures (corresponding to 30) formed by two inclined surfaces differing in angle of inclination. The use of a Fresnel prism as the image splitting basic prism leads to a smaller thickness of the focus indicating part and also leads to an advantage which will later be described.

In the foregoing description of the embodiments, the effect which the diffracting action by the diffraction lattice component provided on the light deflecting portion of the focus indicating part brings about during the detection of the focus condition has been particularly explained and now, another effect which the diffracting action existing with the light deflecting action of the prism brings about will be fully described.

Figure 19A:
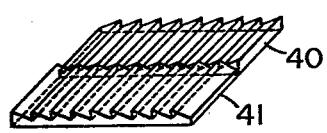
FIGS. 19A and 19B are a perspective and a cross-sectional view, respectively, of a focus indicating part comprising a diffraction lattice alone.
Figure 19B:
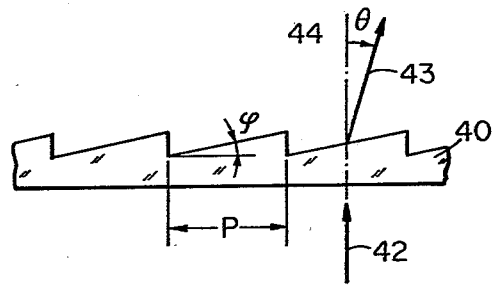

As previously described, the focus indicating part of the prior art using an image splitting bi-prism usually directs to the eye the light ray forming an angle of $\delta \approx 4°$ with respect to the optical axis (the light ray 9 in FIG. 6) and utilizes it for the focus indicating and therefore, for the light beam from a lens having a large F-number, for example, f/5.6 or greater in which such light ray is eclipsed, dark change occurs and the focus indicating cannot be accomplished. As a method which will overcome such disadvantage, a focusing screen would occur to mind in which phase type diffraction lattices of sawtooth-like cross-section as shown in FIGS. 19A and 19B are oppositely oriented in the upper and lower semicircular portions of the circular focus indicating part. However, as shown below, the aforementioned disadvantage cannot fully be eliminated by a system including such a focus indicating part formed only by ordinary diffraction lattices.

Figure 20:
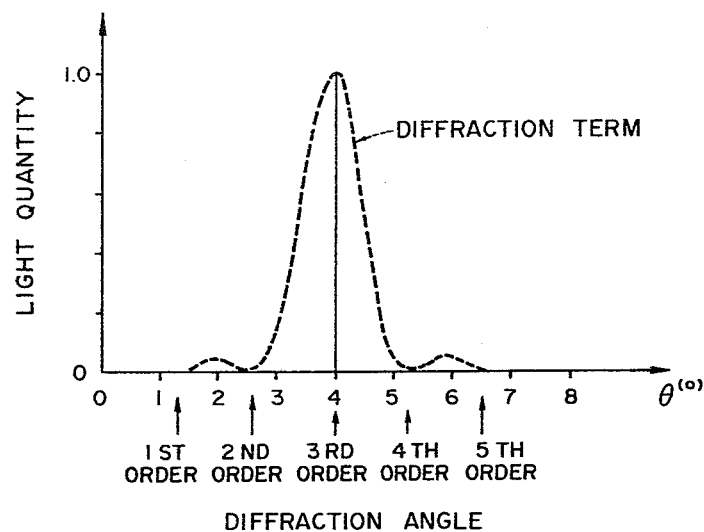
FIG. 20 is a graph of the diffraction term of the diffraction lattice shown in FIG. 19B.
Figure 21:
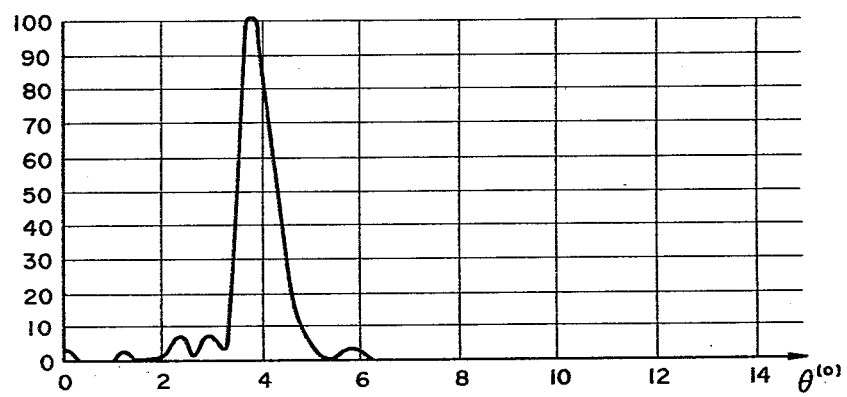
FIG. 21 is a graph of the diffracted light distribution of the FIG. 19B diffraction lattice for white light.

In order to know how the light beam from the exit pupil of the lens is utilized for the focus indicating in the focus indicating part shown in FIG. 19A, a light beam is caused to enter from the direction of the optical axis of the view finder and how the diffracted light produced by this focus indicating part is distributed will be calculated. For the comparison with an embodiment of the present invention which will later be described, the distribution of the diffracted light will be calculated with the condition of this diffraction lattice set to a value approximate to that of the embodiment of the present invention. As shown in the cross-sectional view of FIG. 19B, the pitch of this diffraction lattice is $P=25$ $\mu$m, the angle of inclination of each wedge member is $\phi=8°$, the refractive index of the constituent member 40 of the focus indicating part is $n=1.49$, and the wavelength of the incident light beam 42 is $\lambda=0.55$ $\mu$m. The diffracted light distribution by such a diffraction lattice, as described in *Principles of Optics*, written by Born and Wolf, pp. 401–405, can be obtained from the product of a term providing the extent of the diffraction pattern by the unit structure of the diffraction lattice (hereinafter referred to as the diffraction term) and a diffraction spectrum determined by the lattice period P (hereinafter referred to as the interference term). Assuming that the number of the diffraction lattice lines is sufficiently great, this interference term, as is well-known, becomes the sum of $\delta$-functions having a peak only at the angle of $\theta_N$ determined by $P \cdot \sin \theta_N = N \cdot \lambda$ ($N=0, \pm 1, \pm 2, \ldots$). The diffracted light distribution thus obtained in the case of the aforementioned lattice condition is shown in FIG. 20. As shown there, by the diffraction in this diffraction lattice, the 3rd order diffracted light is intensely created in a direction having an inclination of 4° with respect to the optical axis, and diffracted lights of the other orders are scarcely created.

Where the incident light 42 is white light, the diffracted light distribution for the white light may be obtained by sampling the wavelength $\lambda=0.4-0.7$ $\mu$m at intervals of 0.01 $\mu$m, obtaining the diffracted light distribution at each wavelength, and summing up the diffracted light distributions with the weight of the relative luminosity factor of the naked eye added thereto. This is shown in FIG. 21. The reason why the weight of the relative luminosity factor of the naked eye is added is that in a camera, the brightness of an image sensed by the naked eye when the image is viewed by the naked eye through the view finder is important.

As seen from FIG. 21, the extent of the diffracted light in the case of white incident light is such that the diffraction angle $\theta$ concentrates in the vicinity of $\theta=3°-5°$. Accordingly, in this focus indicating part, of the light beams entering the focus indicating part from the exit pupils of the lens, only the light rays entering at an angle of 3°-5° with respect to the optical axis of the view finder are directed to the observing eye so as to be utilized for the focus indicating. In the focus indicating part using the diffraction lattice shown in FIGS. 19A and B, the range of angle of the light beam available for the focus indicating is slightly wider than in the focus indicating part using the image splitting bi-prism and therefore, even for interchangeable lenses having a wider range of F-number, the image on the focus indicating part does not dark-change. However, this extent is still small and insufficient.

In an embodiment which will now be described, the range of incidence angle of the light ray available for the focus indicating is wider than that shown in FIGS. 19A and B. Each light deflecting portion in the focus indicating part of the focusing screen of the present invention has a prism action and a diffracting action and therefore, by selecting the pitch of the diffraction lattice and the vertical angle of the prism, utilization of a light ray forming what degree of angle with respect to the optical axis of the view finder for the purpose of focus indicating can be controlled in designing. Accordingly, optimal focusing screens can be designed in accordance with various camera systems.

Figure 22A:
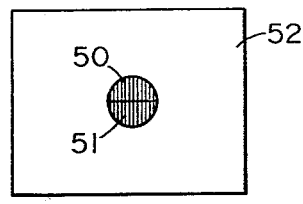
FIGS. 22A, 22B and 22C are a plan view of the focusing screen according to another embodiment of the present invention, a perspective view of the focus indicating part and a cross-sectional view of the light deflecting portion, respectively.

Some examples of the design of the focusing screen of the present invention will be shown below, and these design examples have been made for the embodiment as shown in FIGS. 22A, B and C.

Figure 22B:
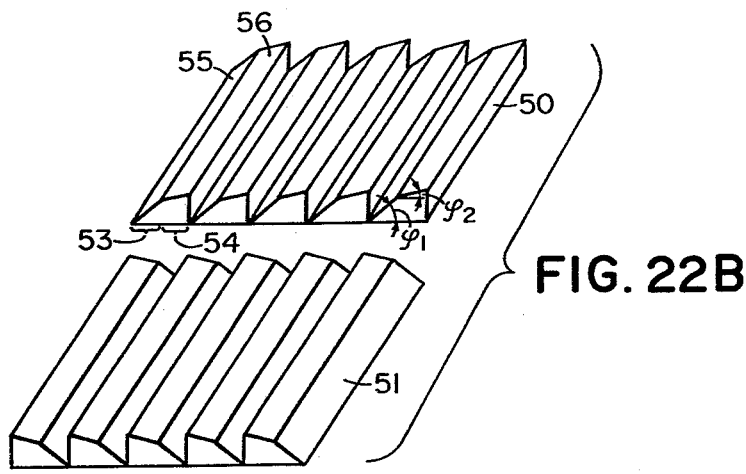
Figure 22C:
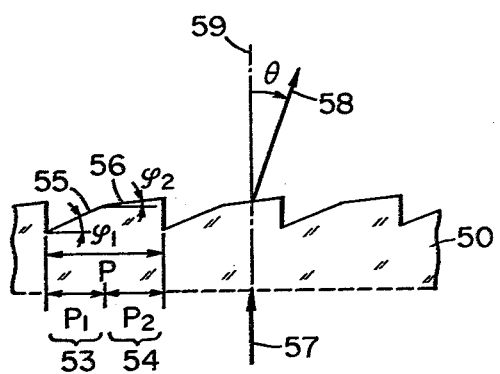

FIGS. 22A is a plan view of the focusing screen 52. As shown there, a focus indicating part comprising light deflecting portions 50 and 51 is provided in the center of this screen. FIG. 22B is an enlarged perspective view of the focus indicating part, and FIG. 22C is a cross-sectional view of the light deflecting portion 50. As is apparent, this portion is equivalent to the light deflecting portion shown in FIG. 17, and as shown, on each Fresnel band of a Fresnel prism, a unit concave-convex structure of the diffraction lattice smaller than the width of the Fresnel band is mounted to form two light deflecting portions 50 and 51 which are oppositely combined to constitute a focus indicating part. Each Fresnel band shown in FIG. 22C is of a double wedge type structure which comprises minute prism portions 53 having a vertical angle $\phi_1$ and minute prism portions 54 having a vertical angle $\phi_2$. In the design examples which will hereinafter be described, the symbols of parameters are those shown in FIG. 22C. That is, $P_1$, $\phi_1$ and $P_2$, $\phi_2$ are the widths and vertical angles, respectively, of the minute prism portions 53 and 54, and P is the width (or pitch) of a Fresnel band. The material forming each light deflecting portion 50, 51 is acryl having a refractive index 1.49. Further, in each design example, in order that the characteristic thereof may be compared with the example shown in FIGS. 19A and B, in what light quantity distribution the light beam 57 entering a light deflecting portion 50 from the direction of the optical axis as shown in FIG. 22C is deflected with respect to the angle $\theta$ from the optical axis will be considered hereinafter.

The angle distribution of the transmitted light by these light deflecting portions is attributable to the prism action and the diffracting action of the light diffracting portions, but in the following description of the design examples, to help comparison with the example shown in FIGS. 19A and B, the light deflecting portion shown in FIG. 22C will be regarded as a kind of diffraction lattice and the aforementioned angle distribution will be explained as being attributable to the diffracted light distribution thereof.

Design Example 1:

$P=24$ $\mu$m, $P_1=P_2=12$ $\mu$m, $\phi_1=10.83°$, $\phi_2=5.66°$

Figure 23:
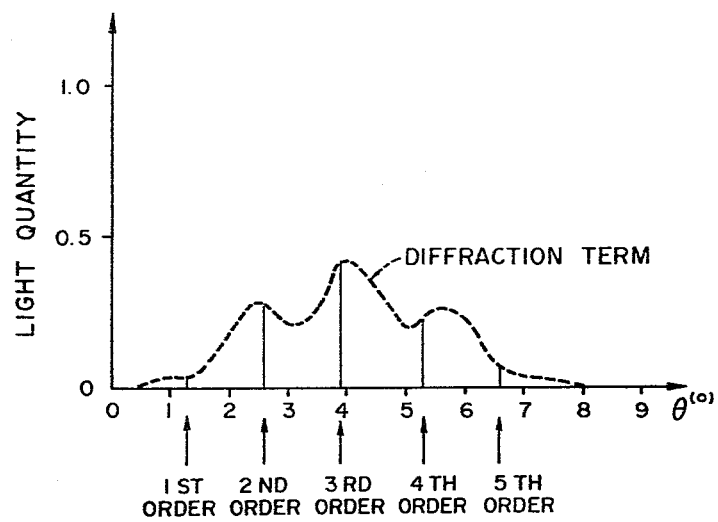
FIG. 23 is a graph of the diffraction term of the light deflecting portion shown in FIG. 22C.
Figure 24:
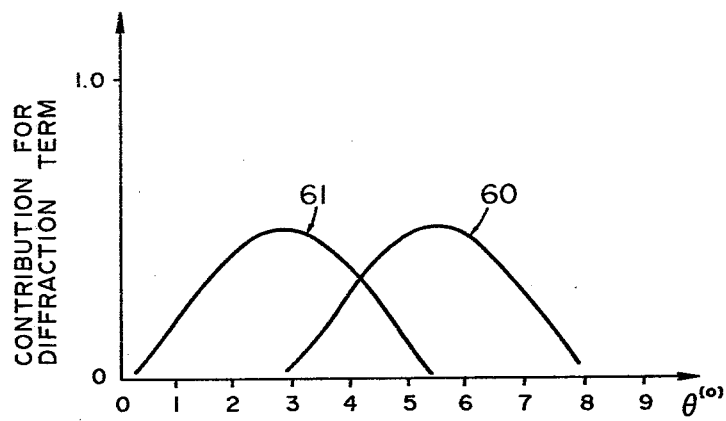
FIG. 24 is a graph of the contribution for diffraction term of minute prism portions 53, 54.

In this Design Example 1, for comparison with FIG. 20, the calculation of the diffracted light distribution for the incident light of $\lambda = 0.55$ μm from the direction of the optical axis is shown in FIG. 23. As compared with FIG. 20, the diffraction term is much widened, so that a number of each order diffracted lights are created between $\theta = 1°-7°$. If, as previously described, a Fresnel band of the light deflecting portion shown in FIG. 22C is resolved into a minute prism portion 53 having an inclined surface 55 having an angle of inclination $\phi_1$ and a minute prism portion 54 having an inclined surface 56 having an angle of inclination $\phi_2$, then the diffraction term of FIG. 22 will be considered to be the result of the interference between the extent 60 by the diffraction in the minute prism portion 53 and the extent 61 by the diffraction in the minute prism portion 54, as shown in FIG. 24.

Figure 25:
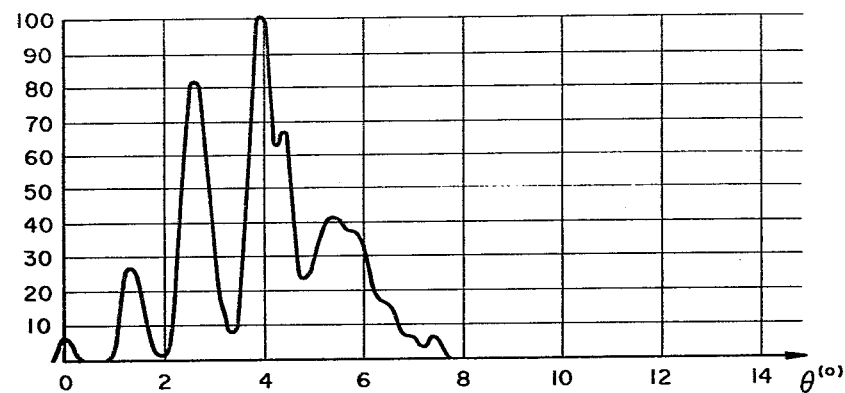
FIGS. 25, 26, 27 and 28 show the diffracted light distributions of the light deflecting portion of FIG. 22C in numerical value design examples 1, 2, 3 and 4.

Further, when the diffracted light distribution for white incident light is calculated as already described with respect to FIG. 21, the result will be such as shown in FIG. 25. In this design example, the diffracted light distribution extends over a much wider range than in the case of FIG. 21.

Accordingly, the focus indicating part of the present design example can direct a light beam of a wide incidence angle range, of the light beams from the exit pupil of the lens, to the observing eye and utilize it for the focus indicating. In the case of the focus indicating part having the characteristic shown in FIG. 21, the light beam the exit pupil of a lens having a large F-number in which an incident light beam having an incidence angle of 3° or greater does not exit does not reach the observing eye and accordingly, the image on the focus indicating part dark-changes to make the focus indicating difficult. In the focus indicating part of the present design example, even for a lens having such a large F-number, a light beam having an incidence angle of 1°-3° can be directed to the observing eye and utilized for the focus indicating.

Design Example 2:

$$P = 24 \text{ μm}, P_1 = P_2 = 12 \text{ μm}, \phi_1 = 8.5°, \phi_2 = 5.67°$$

Figure 26:
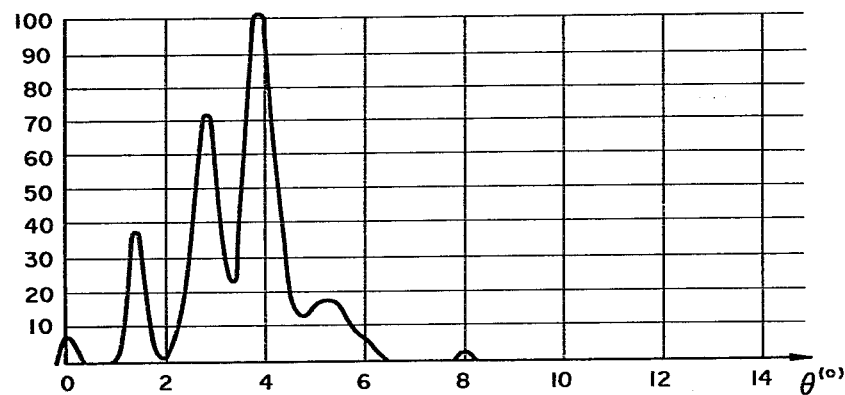

The diffracted light distribution for white light entering the light deflecting portion in the focus indicating part of this Design Example 2 is shown in FIG. 26. As compared with Design Example 1 (FIG. 25), the present design example is characterized in that the diffracted light whose diffraction angle $\theta$ is 6° or greater is reduced in quantity. Accordingly, for a lens having such an F-number that the incident light having an incidence angle of 6° or greater is small in quantity, the image on the focus indicating part is not darkened but can be used.

Design Example 3:

$$P = 24 \text{ μm}, P_1 = P_2 = 12 \text{ μm}, \phi_1 = 12.0°, \phi_2 = 3.5°$$

Figure 27:
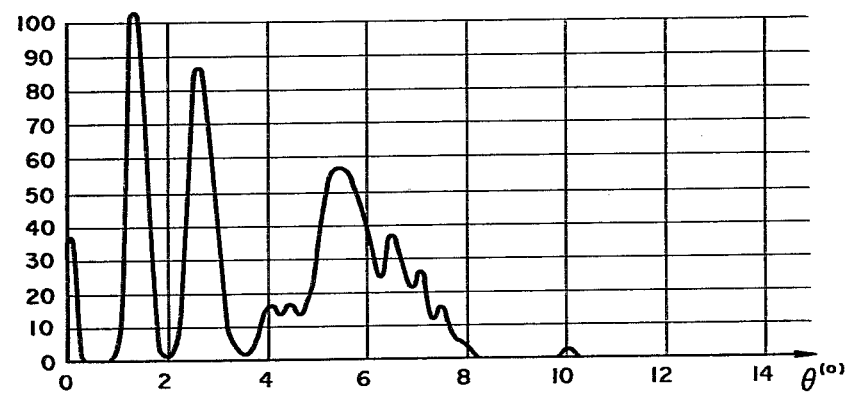

The diffracted light distribution for white light entering the light deflecting portion in the focus indicating part of this Design Example 3 is shown in FIG. 27. As compared with Design Example 1 (FIG. 25) and Design Example 2 (FIG. 26), this design example is characterized in that the quantity of the diffracted light between the diffraction angle $\theta$ 0°-2° is great. Therefore, even for a lens having a considerably small aperture ratio, the image on the focus indicating part is little darkened. The 0-order diffracted light is about 4% of the whole quantity of diffracted light and consequently, the quantity of light available for the focus indicating is great and thus, the accuracy of the focus indicating is little reduced.

Design Example 4:

$$P = 30 \text{ μm}, P_1 = P_2 = 15 \text{ μm}, \phi_1 = 11.0°, \phi_2 = 3.5°$$

Figure 28:
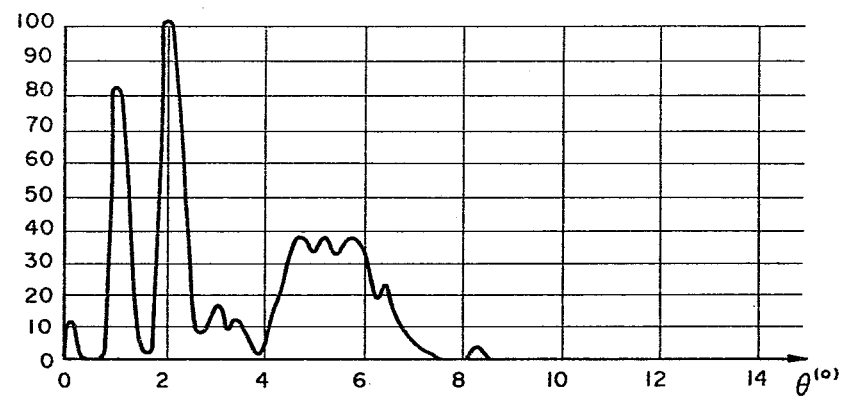

The diffracted light distribution for white light entering the light deflecting portion in the focus indicating part of this Design Example 4 is shown in FIG. 28. In this design example, as compared with the previous three Design Examples 1, 2 and 3, the widths $P_1$ and $P_2$ of the minute prism portions are different. The diffracted light distribution in this design example is substantially the same as that in Design Example 3, but the quantity of 0-order diffracted light is smaller than that in Design Example 3.

Four preferred design examples have been described above, and desirable conditions for further improved characteristic of the focus indicating part used in the focusing screen of the present invention will hereinafter be described.

Figure 29:
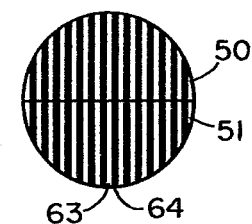
FIG. 29 shows the dark regions of the focus indicating part using the light deflecting portions of FIGS. 16, 17 and 18.

When the focusing screen 52 of the present embodiment shown in FIGS. 22A, 22B and 22C is disposed in the view finder of a single lens reflex camera and the aperture of the objective lens is gradually stopped down, the focus indicating part begins to become dark from a certain F-number or greater in the pattern as shown in FIG. 29. The dark portion 64 in FIG. 29 is an area corresponding to the minute prism portion 55 of FIGS. 22B and 22C. This is because this minute prism portion having an inclined surface having a great angle of inclination sustains the contribution 60 of a portion having a great diffraction angle as shown in FIG. 24 for the diffraction term and, as the aperture of the objective lens is stopped down, the incident light beam corresponding to this great angle is eclipsed by the aperture and does not enter the focus indicating part. Accordingly, this minute prism portion having an inclined surface having a large angle of inclination dark-changes first.

It is not preferable that the image on the focus indicating part looks in the light-and-dark figure as shown in FIG. 29. This may be improved by reducing the pitch of the diffraction lattice to thereby reduce the width of the minute prism portion and reducing the periodical pattern of this light-and-dark figure to such a degree of fineness that it cannot be resolved by the naked eye when the focus indicating part is viewed through the view finder. If the resolution of the naked eye is taken into account, the pitch of the diffraction lattice provided on the light deflecting portions of the focus indicating part should desirably be 50 μm or less, including the case where the focusing screen of the present invention is applied as the focusing screen of an ordinary single lens reflex camera. Accordingly, in the case of the focus indicating part of the form shown in FIGS. 22A, 22B and 22C, the pitch P of the prism-like unit structure (corresponding to a Fresnel band) comprising minute prism portions 53 and 54 should also desirably be 50 μm or less.

On the other hand, it is not preferable that the pitch of the diffraction lattice provided on the focus indicating part is too small. The reason will be shown below. Among the diffracted lights available for the focus indicating, it is the 1st order diffracted light that has the smallest diffraction angle. Because the 0-order diffracted light does not contribute to the image splitting even in defocus condition. Accordingly, for a lens having such an F-number that a light beam having an incidence angle corresponding to the diffraction angle of the 1st order diffracted light is eclipsed, the focus indicating part does not cause the image splitting to take place. For example, the focus indicating part of Design Example 2 having the diffracted light distribution of FIG. 23 enables the focus indicating in a camera provided with a lens in which a light beam entering the focus indicating part at an incidence angle of 1.30 or greater exists, but where a lens having a smaller aperture is used, the focus indicating is impossible.

Figure 30:
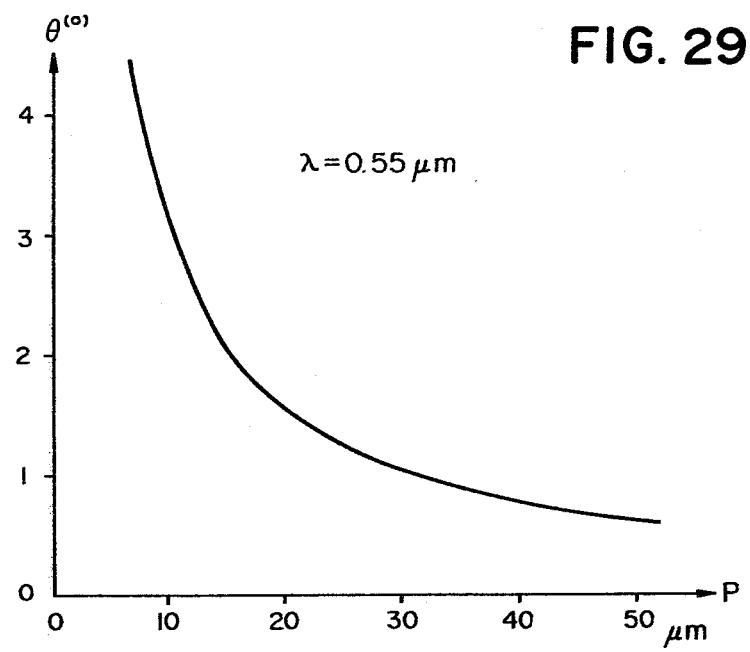
FIG. 30 shows the correlation between the synchronization of the diffraction lattice and the angle of incidence of the incident light utilizable for the focus indicating.

Generally, a relation that $\sin \theta_1 = \lambda/P$ ($\lambda$: wavelength of light) lies between the diffraction angle $\theta_1$ of the 1st order diffracted light and the pitch P of the diffraction lattice. When $\lambda = 0.55$ μm, this relation is shown in the graph of FIG. 30. From this graph, the F-numbers of the lens for which a light beam having an incidence angle corresponding to the 1st order diffraction angle $\theta_1$ begins to be eclipsed as shown in the table below.

| Pitch of diffraction lattice | F-number |
|---|---|
| 11 μm | 10 |
| 10 | 9.1 |
| 9 | 8.2 |
| 8 | 7.3 |
| 7 | 6.4 |
| 6 | 5.5 |

Accordingly, as the pitch of the diffraction lattice becomes smaller, the F-number for which the incident light corresponding to the 1st order diffraction angle is eclipsed becomes smaller and as a result, when the pitch of the diffraction lattice is very small, the focus indicating cannot take place even if a high speed lens is used.

With the fact taken into account that the vicinity of f/5.6 is the available limit in the focusing screen using a conventional image splitting bi-prism, and in order that a performance superior to that of the conventional product may be provided with regard to the F-number of a lens with which the focusing screen of the present invention can be used, the pitch of the diffraction lattice provided on the focus indicating part should desirably be 7 μm or greater. However, the desirable lower limit value of the pitch of the diffraction lattice is restricted also by still another factor. That is, where the pitch of the diffraction lattice is made very small, the diffraction term has a more widened characteristic and therefore, the 0-order diffracted light which does not contribute to the focus indicating becomes very great in quantity. Particularly, where the diffraction lattice used is a phase diffraction lattice of sawtooth-like cross-section, the width $P_2$ of the minute prism portion having an inclined surface having a small angle of inclination $\phi_2$, such as 21, 27 in FIG. 16 or 54 in FIG. 22B, also becomes very small and the contribution 61 (FIG. 24) to the diffraction term by this minute prism portion has a widened characteristic and therefore, if the configuration of the lattice is designed so as to secure some extent of quantity of diffracted light for the 1st order diffracted light, an innegligible quantity of 0-order diffracted light will be produced.

Design Example 5:

$P = 10$ μm, $P_1 = P_2 = 5$ μm, $\phi_1 = 12.7°$, $\phi_2 = 6.4°$

Figure 31:
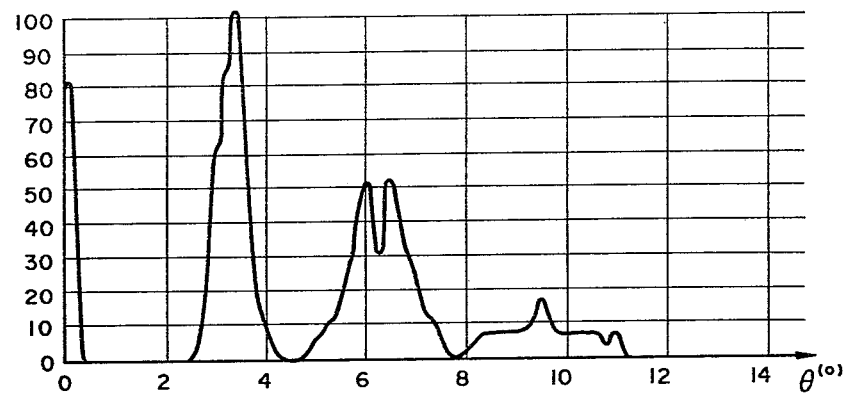
FIGS. 31, 32 and 33 show the diffracted light distributions in design examples 5, 6 and 7.

The diffracted light distribution for white incident light in this design example is shown in FIG. 31. If, as in this design example, the pitch of the prism-like unit structure, namely, the pitch of the diffraction lattice, is of the order of 10 μm, the 0-order diffracted light becomes considerably intense and amounts to 15% of the total diffracted light. A value up to this value of the 0-order diffracted light is the limit for maintaining the performance with which the focus indicating part can be effectively used and accordingly, when the aforementioned problem of the 1st order diffracted light being kicked is taken into account, the pitch of the diffraction lattice should desirably be 10 μm or greater.

From what has been described above, it is seen that including the condition for which the light-and-dark figure of the focus indicating part is not seen, the most preferable range of the pitch of the diffraction lattice provided on the focus indicating part is 10 μm $\leq P \leq$ 50 μm. Of course, this range is also preferable for the embodiments of FIGS. 2, 7, 8, 10A, 11, 16 and 18.

In the case of the embodiments shown in FIGS. 7 and 22C, the pitch of the diffraction lattice is coincident with the arrangement period of the prism-like unit structures and therefore, the arrangement period of the prism-like unit structures should also preferably satisfy said range.

Also, in the focus indicating part as shown in FIGS. 16, 17, 18 and 22 wherein the light deflecting portion is formed by repetition of two inclined surfaces having angles of inclination $\phi_1$ and $\phi_2$, a good performance can be obtained by further satisfying the following condition. This is based on the fact that the diffracted light distribution can be controlled also by varying the angles $\phi_1$ and $\phi_2$. The diffraction term which brings about such diffracted light distribution is shown in FIG. 24, and if the angles which should be the peaks of the contribution 60 from the inclined surface having the angle of inclination $\phi_1$ to the diffraction term and the contribution 61 from the inclined surface having the angle of inclination $\phi_2$ are $(H)_1$ and $(H)_2$, respectively, then $$\tan \phi_i = \frac{1}{n-1} \sin (H)_i \ (i = 1, 2)$$

Because $\phi_i$ and $(H)_i$ are small, there is approximately the following relation:

$$\phi_i \simeq \frac{(H)_i}{n-1}$$

where n is the refractive index of the material forming the focus indicating part. Accordingly, by setting the angle of $\phi_i (i=1, 2)$, the positions of the peaks of the contributions 60 and 61 of the diffraction term can be controlled.

In a focusing screen incorporated into a single lens reflex camera, in order that the focus indicating may be possible even for a lens having a small aperture, the position of the peak of the diffraction term 61 should desirably be 5° or less. This is because, if the peak position of the diffraction term 61 exceeds 5°, the diffracted light having a small diffraction angle of 4° or less becomes small in quantity and the image on the focus indicating part dark-changes for an interchangeable lens having a small aperture. Consequently, the condition that $\phi_2 \leq 5°/(n-1)$ should desirably be satisfied. Where the material of the focusing screen is acryl having a refractive index $n=1.49$, the upper limit value of $\phi_2$ is about 10°. A design example for $\phi_2 = 10°$ will be shown below.

Design Example 6:

$P = 24 \ \mu m$, $P_1 = P_2 = 12 \ \mu m$, $\phi_1 = 16.0°$, $\phi_2 = 10.0°$

Figure 32:
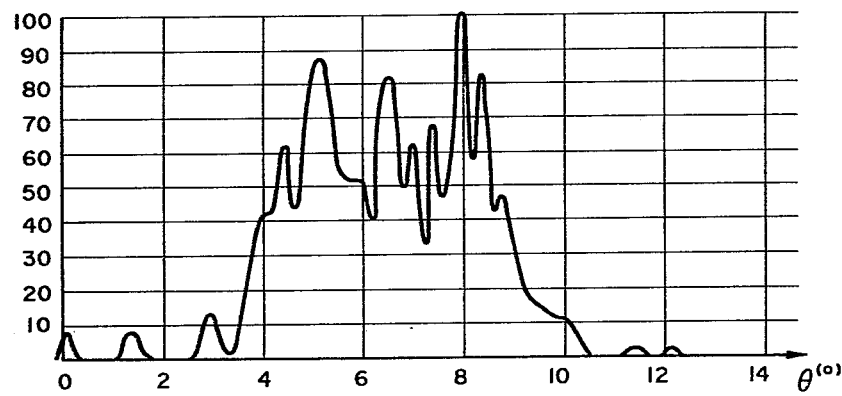

The diffracted light distribution for white incident light in this design example is shown in FIG. 32.

As seen from FIG. 32, the diffracted light having a diffraction angle of 4° or less is small in quantity and if $\phi_2$ is a greater angle, the diffracted light having a smaller diffraction angle is decreased in quantity and the image on the focus indicating part becomes liable to dark-change for a lens having a small aperture.

Also, if the greater angle of inclination $\phi_1$ is made too great, the peak position of the diffraction term 60 becomes deviated toward the greater diffraction angle. Therefore, the diffracted light having a great diffraction angle is increased to enhance the accuracy of the focus indicating, but the focus indicating part becomes darkened even when an interchangeable lens having a bright F-number is mounted. In the case of the ordinary single lens reflex camera, it is desirable that the focus indicating part be not darkened up to the order of F3.5. The diffraction angle $\theta$ corresponding to this F-number is 8.2° and therefore, $\phi_1$ should desirably satisfy the condition that $$\phi_1 \leq \frac{8.2°}{n - 1}.$$

Where $n = 1.49$, the upper limit value of $\phi_1$ is about 16°.

Design Example 6 is also a design example using this upper limit value of $\phi_1$ and, in FIG. 32 which shows the diffracted light distribution thereof, the diffracted light has a diffraction angle amounting to the vicinity of 11°, but if $\phi_1$ is further increased, the diffracted light having a greater diffraction angle is increased and the dark of the focus indicating part becomes more and more remarkable.

From the foregoing fact, it is desirable in order to obtain a good performance of the focus indicating part that the angles of inclination $\phi_1$ and $\phi_2$ be equal to or less than $8.2°/n - 1$ and $5°/n - 1$, respectively.

Next, the influence imparted to the diffracted light distribution by a great difference between the angles of inclination $\phi_1$ and $\phi_2$ will be shown in Design Example 7.

Design Example 7:

$P = 40 \ \mu m$, $P_1 = P_2 = 20 \ \mu m$, $\phi_1 = 15°$, $\phi_2 = 5°$

Figure 33:
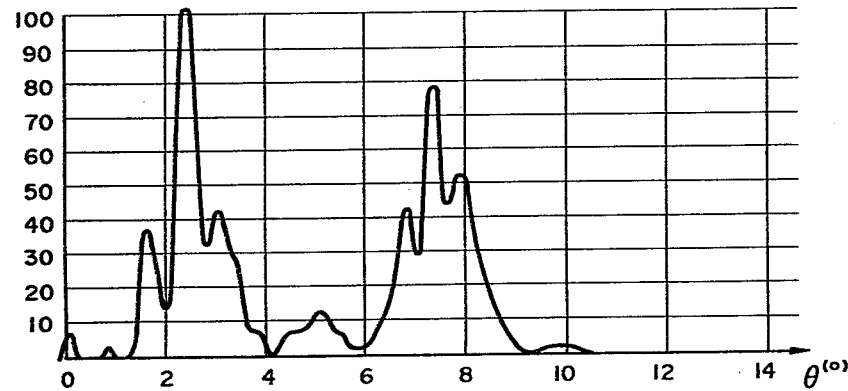

The diffracted light distribution for white incident light in this design example is shown in FIG. 33. It is seen from FIG. 33 that in this design example, the diffracted light having a diffraction angle $\theta$ in the vicinity of 4°–6° is small in quantity. In the light deflecting portion having such diffracted light distribution, even if the aperture diameter of the lens is varied from the condition in which the light beam having an incidence angle of 6° begins to be eclipsed until the light beam having an incidence angle 4° begins to be kicked, the light beam available for the focus indicating is only the light beam having an incidence angle of 4° or less and therefore, even if the aperture diameter is increased so that the maximum incidence angle of said incident light beam varies from 4° to 6°, the accuracy of the focus indicating remains low. From such a point of view, it is desirable that the diffracted light be continuously distributed in a certain range of diffraction angle and accordingly, it is not preferable that the difference between the angles of inclination $\phi_1$ and $\phi_2$ is too great.

Figure 34:
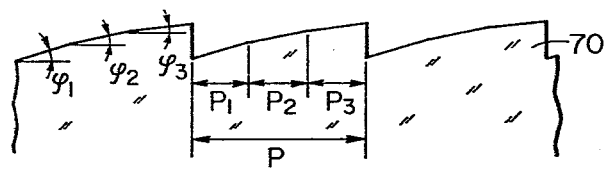
FIG. 34 is a cross-sectional view of the light deflecting portion according to still another embodiment.

FIG. 34 is a cross-sectional view of the light deflecting portion according to another embodiment of the present invention. In this embodiment, the light deflecting portion 70 comprises wedge type unit structures of two diffraction lattices provided on a Fresnel band of the image splitting prism, and if viewed from another standpoint, comprises prism-like unit structures formed by three inclined surfaces having angles of inclination, $\phi_1$, $\phi_2$ and $\phi_3$ and arranged at a period P. Further, a light deflecting portion comprising prism-like unit structures formed by four or more inclined surfaces having different angles of inclination and periodically arranged is also applicable to the focusing screen of the present invention. Also, in the two light deflecting portions forming the focus indicating part according to the present invention, it is possible that the angles of inclination of the prisms and the diffraction lattices are different. Further, in FIGS. 16 and 22B, it is not necessary that $P_1 = P_2$, but if the width of the minute prism portion having a small angle of inclination is made greater, the diffracted light having a lower diffraction angle will be increased in quantity and, if the width of the minute prism portion having a great angle of inclination is made smaller, the diffracted light having a higher diffraction angle will be increased in quantity, whereby the characteristic of the focus indicating part may be varied.

To make the focus indicating part as described above, use may be made of a method which comprises applying photoresist onto a prism forming a conventional split image focus indicating part, making a concavo-convex structure by the photoetching technique, obtaining a metal mold from the concavo-convex structure by the electrocasting technique, and using this metal mold to transfer the concavo-convex structure onto plastics.

Figure 35:
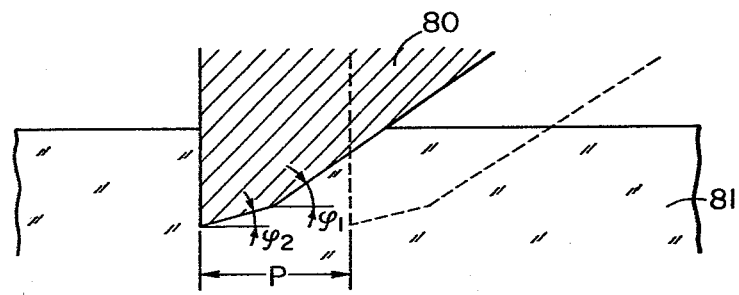
FIG. 35 illutrates a method of making a metal mold for mass-producing the light deflecting portion shown in FIGS. 22B and 22C.

The focus indicating part of the form shown in FIGS. 22A, 22B and 22C may be made by rendering the edge shape of a diamond tool 80 used during the making of a metal mold into a shape as shown in FIG. 35, core-lining a metal mold 81 by the diffraction lattice core-lining technique, and making a number of plastic copies from the metal mold 81. Particularly, the focus indicating part of this type is also suited for the injection molding because it has a small degree of surface roughness as compared with the conventional image splitting biprism.

The above embodiments have been shown with respect to an example in which there are two light deflecting portions in the focus indicating part, and various examples of application thereof will be shown hereinafter.

FIG. 36A is a plan view of a focusing screen 94. Designated by 92 and 93 are focus indicating parts of the hitherto described cross-section which will cause lateral deviation of the image. Portions 90 and 91 have a construction as obtained by rotating the focus indicating parts 92 and 93 by 90° about the center axis.

Accordingly, when the focus indicating is effected with respect to the reticule 95 on an object by the use of these focus indicating parts, a blurred image as shown in FIG. 36B will be viewed in defocus condition.

Description will now be made of an embodiment in which the direction of the prism forming the light deflecting portion and of the diffraction lattice provided thereon is made to differ from that in the hitherto described embodiments by 90°. For example, in the light deflecting portion of FIG. 2, only the diffraction lattice 5 of FIG. 3 is rotated by 90° with respect to the optical axis, whereafter it is made integral with the prism 4. The split image by the prism portion can be utilized with respect to the longitudinal line, and the double image by the diffraction lattice can be utilized for the focusing with respect to the lateral line, thereby overcoming the disadvantage that with the conventional split image focus indicating part, the focusing is difficult with respect to a line parallel to the prism borderline.

As will be seen in the present embodiment, the minute structure on the split prism is not limited in direction even if it is one-dimensional, and accordingly, it may also be made into two-dimensional construction.

Figure 38A:
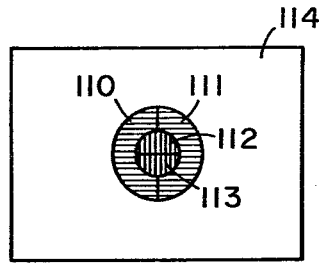
FIGS. 38A and 38B show the focusing screen in a third application.
Figure 39:
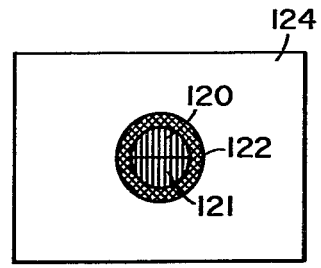
FIG. 39 shows the focusing screen in a fourth application.

Other examples of application are shown in FIGS. 37A, 38A and 39. FIG. 37A shows an example in which the light deflecting portions shown in FIG. 17 are provided in the four areas 100, 101, 102 and 103 of the focus indicating part in different directions. Cross-sectional views along A—A' and B—B' are shown in FIG. 37C. FIG. 37B shows the image in defocus condition when the reticule has been observed by the use of this focusing screen 104. FIG. 37D shows the reticule image when the cross-section along B—B' is made into the same shape as the cross-section along A—A'.

Figure 38B:
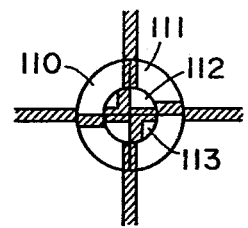

In FIG. 38A, the directions of the lattice lines are orthogonal to each other in inner areas 112 and 113 and outer areas 110 and 111. Also, in the areas 110 and 111, the directions of the prisms are opposite to each other. This also holds true with the areas 112 and 113. The reticule image in defocus condition in this focusing screen is shown in FIG. 38B.

In the focusing screen shown in FIG. 39, inner areas 120 and 121 are light deflecting portions having a diffraction lattice, and an outer area 122 is a conventional microprism range finder portion.

In view of the fact that the split image type focus indicating system generally has a disadvantage that it encounters difficulties in focus indicating for an object of a lateral line pattern, the embodiments shown in FIGS. 36A–39 provide a focusing screen which overcomes such disadvantage. Accordingly, the focusing screen of these embodiments can accomplish accurate focus indicating for a linear image in any direction.

The focusing screen of the present invention is useful not only in cameras, but also in various optical instruments.

What we claim is:

1. In a split-image type range finder system having an objective lens for forming an image plane, a focusing screen comprising:
    a plurality of light deflecting portions in each of which members of prism-like unit structure are arranged with a period "P" in a direction different from the other, said prism-like unit structure, in the cross-section thereof, having the surface thereof formed by a plurality of inclined surfaces having different angles of inclination with respect to the image plane, said period "P" being greater than 10 μm and less than 50 μm.

2. A focusing screen according to claim 1, wherein the smallest of the angles of inclination which the plurality of inclined surfaces forming the surface of said prism-like unit structure forms with the image plane is less than about 5° and the greatest of said angles of inclination is less than about 16°.

3. A focusing screen according to claim 1, wherein a pair of said light deflecting portions are semicircular and together form a focus indicating part of circular area, and said members of prism-like unit structure of said pair of light deflecting portions are oriented oppositely to each other.

4. A focusing screen according to claim 1, wherein four light deflecting portions each are a quarter of a circle and together form a focus indicating part of circular area, and two adjacent light deflecting portions have their respective members of prism-like unit structure oriented in directions different from each other by 90°.

5. A focusing screen according to claim 3 or 4, wherein a number of microprisms are arranged on the outer peripheral portion of said focus indicating part.

6. In a split image type range finder system having an objective lens for forming an image plane, a focusing screen comprising:
    a plurality of light deflecting portions each of which comprises:
        (a) a prism component having a light deflecting function for providing part of an out-of-focus image with displacement in one direction; and
        (b) a diffraction lattice component formed on said prism component and having a periodicity in said one direction for diffracting the light incident thereon.

7. A focusing screen according to claim 6, wherein said diffraction lattice component comprises a relief and phase type diffraction lattice.

8. A focusing screen according to claim 7, wherein said prism component comprises a Fresnel prism.

9. A focusing screen according to claim 8, wherein a unit structure of said relief type diffraction lattice is mounted on a strip portion of said Fresnel prism.

10. A focusing screen according to claim 7, wherein said diffraction lattice component comprises a rectangular type diffraction lattice.

11. A focusing screen according to claim 7, wherein said diffraction lattice component comprises a sawtooth type diffraction lattice.

12. A focusing screen according to claim 6, wherein said periodicity is not more than 50 μm and not less than 10 μm.

13. In a single lens reflex camera having means for selectively mounting interchangeable objective lenses having different relative aperture ratios, a focus indicating system comprising:
    a focusing screen including a pair of light deflecting portions each having a plurality of prism-like unit structures arranged with a periodicity in one direction opposite to the direction of the periodicity of the unit structures in the other light deflecting portion, each said prism-like unit structure having its surface formed by a plurality of inclined surfaces of different inclinations in the direction of periodicity, whereby an out-of-focus image is split and blurred in the direction of periodicity; and
    means for supporting said focusing screen in an image plane in a view finder of the camera.

14. In a split image type rangefinder system having an objective lens for forming an image plane, a focusing screen comprising:
    a plurality of light deflecting portions, each of which comprises:
        (a) a prism component having a light deflecting function for providing part of an out-of-focus image with a displacement in a first direction, and (b) a diffraction lattice component formed on said prism component and having a periodicity in a second direction at a right angle to said first direction of said image displacement, for diffracting the light incident thereon.

15. A focusing screen according to claim 14, wherein said prism component comprises a Fresnel prism.

16. A focusing screen according to claim 15, wherein a unit structure of said diffraction lattice component is mounted on a strip portion of said Fresnel prism.

17. A focusing screen according to claim 14, wherein said diffraction lattice component has a pitch not more than 50 $\mu$m and not less than 10 $\mu$m.

18. A focusing screen according to claim 17, wherein a unit structure of said diffraction lattice component comprises a rectangular type relief diffraction lattice.

19. A focusing screen according to claim 17, wherein a unit structure of said diffraction lattice component comprises a saw-tooth type relief diffraction lattice.

* * * * *